(12) United States Patent
Rupp et al.

(10) Patent No.: US 12,364,382 B2
(45) Date of Patent: Jul. 22, 2025

(54) METHOD FOR CONTROLLING A HOME APPLIANCE

(71) Applicant: BSH Hausgeraete GmbH, Munich (DE)

(72) Inventors: Michael Rupp, Holzheim (DE); Kai Paintner, Welden (DE); Kuldeep Narayan Singh, Dillingen a.d. Donau (DE)

(73) Assignee: BSH Hausgeraete GmbH, Munich (DE)

( * ) Notice: Subject to any disclaimer, the term of this patent is extended or adjusted under 35 U.S.C. 154(b) by 118 days.

(21) Appl. No.: 17/639,658

(22) PCT Filed: Aug. 25, 2020

(86) PCT No.: PCT/EP2020/073695
§ 371 (c)(1),
(2) Date: Mar. 2, 2022

(87) PCT Pub. No.: WO2021/043624
PCT Pub. Date: Mar. 11, 2021

(65) Prior Publication Data
US 2022/0287540 A1    Sep. 15, 2022

(30) Foreign Application Priority Data
Sep. 5, 2019    (EP) .................... 19195575

(51) Int. Cl.
*A47L 15/00*    (2006.01)
*A47L 15/42*    (2006.01)
(Continued)

(52) U.S. Cl.
CPC ....... *A47L 15/0063* (2013.01); *A47L 15/4295* (2013.01); *A47L 15/46* (2013.01);
(Continued)

(58) Field of Classification Search
CPC ... A47L 15/00–508; A47L 2301/00–08; A47L 2401/00–34; A47L 2501/00–36; G06T 3/40–4092
See application file for complete search history.

(56) References Cited

U.S. PATENT DOCUMENTS

| | | | |
|---|---|---|---|
| 2008/0190453 A1* | 8/2008 | Hildenbrand | A47L 15/0044 134/57 D |
| 2009/0205681 A1* | 8/2009 | Choi | A47L 15/46 134/18 |

(Continued)

FOREIGN PATENT DOCUMENTS

| | | | |
|---|---|---|---|
| CN | 106419794 A | * | 2/2017 |
| CN | 106991671 A | | 7/2017 |

(Continued)

OTHER PUBLICATIONS

C. Ledig et al., "Photo-Realistic Single Image Super-Resolution Using a Generative Adversarial Network," 2017 IEEE Conference on Computer Vision and Pattern Recognition (CVPR), pp. 105-114, available at https://ieeexplore.ieee.org/stamp/stamp.jsp?tp=&arnumber=8099502 (Year: 2017).*

(Continued)

*Primary Examiner* — Eric W Golightly
*Assistant Examiner* — Richard Z. Zhang
(74) *Attorney, Agent, or Firm* — Laurence A. Greenberg; Werner H. Stemer; Ralph E. Locher

(57) ABSTRACT

A method for controlling a home appliance depending on a load includes taking a load image with an appliance camera, sending the image from the appliance to the server, processing the image on the server, and generating a processing result. Control data is determined on the server for controlling the appliance based on the result and is then sent to the appliance and/or the processing result is sent to the appliance enabling the appliance to determine data for controlling (Continued)

the appliance based on the processing result. The control data and/or the processing result is received from the server on the appliance and based thereon appliance working programs are controlled. Image processing generating the result includes upscaling the image using a trained generative adversarial network and analyzing the load using a trained neural network. A server, home appliance and system including both are also provided.

13 Claims, 7 Drawing Sheets

(51) Int. Cl.
| | | |
|---|---|---|
| *A47L 15/46* | (2006.01) | |
| *G06N 3/045* | (2023.01) | |
| *G06T 3/00* | (2024.01) | |
| *G06T 3/4046* | (2024.01) | |
| *G06T 3/4053* | (2024.01) | |
| *G06T 3/4076* | (2024.01) | |
| *G06T 7/00* | (2017.01) | |
| *G06T 7/10* | (2017.01) | |
| *H04L 12/28* | (2006.01) | |

(52) U.S. Cl.
CPC ............. *G06N 3/045* (2023.01); *G06T 3/00* (2013.01); *G06T 3/4046* (2013.01); *G06T 3/4053* (2013.01); *G06T 7/00* (2013.01); *G06T 7/10* (2017.01); *H04L 12/2816* (2013.01); *A47L 2401/04* (2013.01); *A47L 2401/34* (2013.01); *A47L 2501/04* (2013.01); *A47L 2501/06* (2013.01); *A47L 2501/07* (2013.01); *A47L 2501/20* (2013.01); *A47L 2501/30* (2013.01); *G06T 3/4076* (2013.01)

(56) References Cited

U.S. PATENT DOCUMENTS

| | | | | |
|---|---|---|---|---|
| 2011/0017235 | A1* | 1/2011 | Berner | A47L 15/4234 134/18 |
| 2012/0058025 | A1* | 3/2012 | Fienup | A47L 15/44 73/861.08 |
| 2012/0060875 | A1 | 3/2012 | Fauth et al. | |
| 2014/0189524 | A1* | 7/2014 | Murarka | G06Q 50/01 715/744 |
| 2015/0356345 | A1* | 12/2015 | Velozo | G06V 40/161 382/103 |
| 2017/0045871 | A1* | 2/2017 | Strahle | A47L 15/4295 |
| 2017/0048325 | A1* | 2/2017 | Tincher | H04W 12/068 |
| 2017/0067739 | A1* | 3/2017 | Siercks | G06T 7/97 |
| 2017/0288581 | A1* | 10/2017 | Fitzpatrick | H02P 25/04 |
| 2019/0012908 | A1* | 1/2019 | Chun | G08G 1/04 |
| 2019/0313880 | A1* | 10/2019 | Lee | B05B 1/02 |
| 2020/0138261 | A1 | 5/2020 | Terradez Alemany et al. | |
| 2020/0301382 | A1* | 9/2020 | Fawaz | G06N 20/00 |
| 2020/0380746 | A1* | 12/2020 | Natesan | G06T 17/10 |
| 2021/0342976 | A1* | 11/2021 | Navarrete Michelini | G06T 5/002 |

FOREIGN PATENT DOCUMENTS

| | | | |
|---|---|---|---|
| CN | 107485356 A | | 12/2017 |
| CN | 108836211 A | * | 11/2018 |
| CN | 108836226 | * | 11/2018 |
| CN | 108852239 | * | 11/2018 |
| CN | 109549597 A | | 4/2019 |
| CN | 110023557 A | | 7/2019 |
| DE | 102011087274 A1 | | 5/2013 |
| DE | 102020112205 A1 | * | 11/2020 |
| EP | 3427630 A1 | | 1/2019 |
| EP | 3498145 A1 | * | 6/2019 |
| EP | 3788933 A1 | | 3/2021 |
| GB | 2377572 A | * | 1/2003 |
| KR | 101784180 B1 | * | 10/2017 |
| WO | WO2013057704 | * | 4/2013 |
| WO | 2018103958 A1 | | 6/2018 |
| WO | WO2018103958 | * | 6/2018 |
| WO | 2019015992 A1 | | 1/2019 |
| WO | WO2019129428 A1 | * | 7/2019 |

OTHER PUBLICATIONS

Vijay Badrinarayanan et al., "SegNet: A Deep Convolutional Encoder-Decoder Architecture for Image Segmentation," 39: 2481-95, IEEE Transactions on Pattern Analysis and Machine Intelligence (2015), Available at https://arxiv.org/pdf/1511.00561.pdf (Year: 2015).*

Tang Xian-Lun et al., Acta Automatica Sinica, Image Recognition With Conditional Deep Convolutional Generative Adversarial Networks, May 2018, vol. 44, No. 5, pp. 855-863.

* cited by examiner

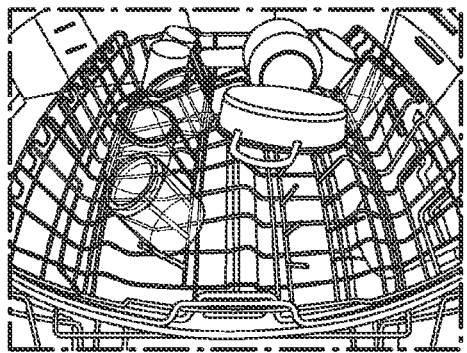
Fig. 3a
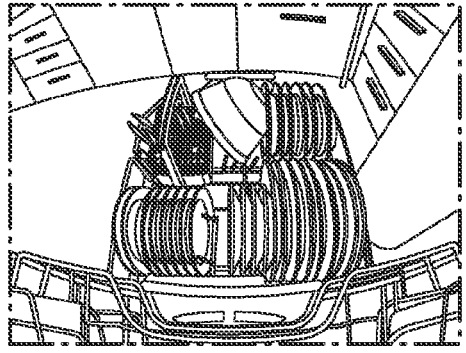
Fig. 3b
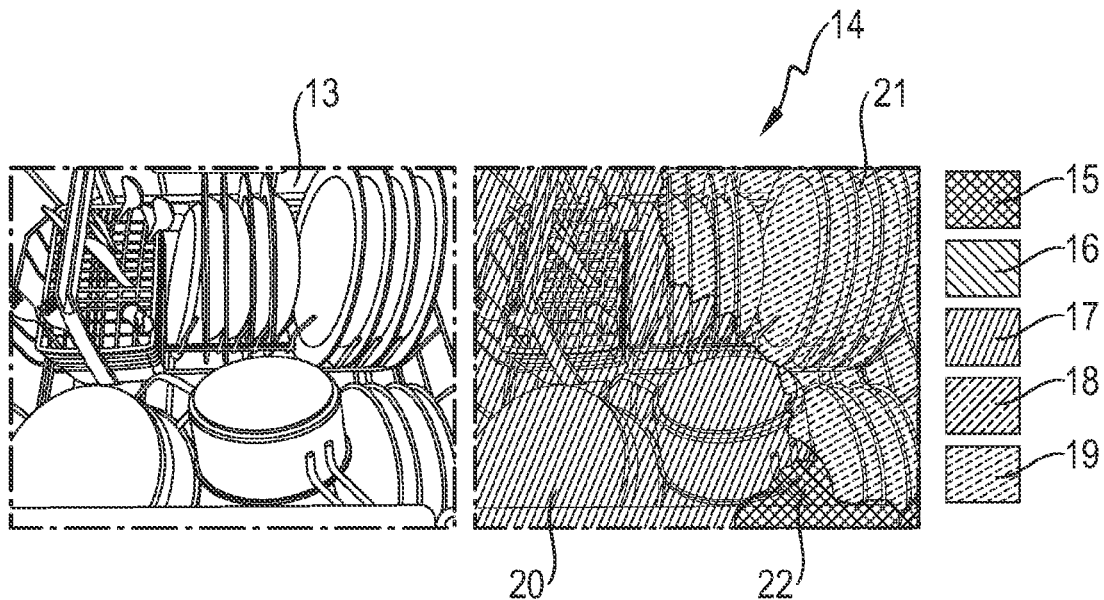
Fig. 4a
Fig. 4b

METHOD FOR CONTROLLING A HOME APPLIANCE

FIELD AND BACKGROUND OF THE INVENTION

The present invention relates to a method for controlling a home appliance, especially a dishwasher, in dependence of a load to be handled by the home appliance, a relating home appliance, a relating computing system and a computer program product.

From US 2012/0060875 A1 it is known that load detection within a dishwasher is desirable because plastic, metal, glass and ceramic differ with regard to their cleaning and drying behavior. Plastic generally has the property that typical dish soiling only adheres relatively loosely. However, plastic dries poorly compared with other types of dish. By contrast, soiling adheres to metal comparatively well. Glass is generally only slightly soiled, with soiling only adhering comparatively loosely. If the dishes present in the dishwasher consist of a material which is comparatively easy to clean, the water pressure and/or the temperature of the wash water can be reduced. Similarly, it is conceivable to shorten the run time of a wash program and/or to reduce the quantity of administered detergent and cleaning aid, whilst still maintaining the necessary cleaning effect. A significant improvement in the efficiency of the dishwasher can be achieved if the load to be handled is known. Moreover, by adjusting the wash program to a load in the dishwasher which includes glass, damage to the relatively sensitive glass can be prevented. In particular the washing out of ions from the glass, which is known as "glass corrosion", can be prevented by adjusting the wash parameters.

To detect the load US 2012/0060875 A1 proposes to arrange a sound transducer in the region of a lower rack because it is particularly well suited to detecting plastic and/or metal, which is more often placed in the lower rack than in the upper rack. In addition, the diswasher of US 2012/0060875 A1 is equipped with at least one light source for illuminating the dishes and at least one camera for the pictorial capturing of light reflexes occurring at the dishes. Particularly contrast-rich light reflexes are produced specifically on glass surfaces, wherein glass is predominantly put into the upper rack of the dishwasher. Therefore, the light source and the camera are arranged in the region of the upper rack of the dishwasher.

While US 2012/0060875 A1 already reaches some improvements, the detection of the load is still rather imprecise, especially with regard to the exact location of certain types of load within the dishwasher. Accordingly, the adaptation of the working program of the dishwasher is rather rudimentary.

SUMMARY OF THE INVENTION

Therefore, it is an object of the present invention to provide an improved technique for controlling a home appliance in dependence of a load to be handled by the home appliance. This object is solved by the subject-matter of the independent claims. Embodiments are specified by the dependent claims, the following description and the appended figures.

Accordingly, the invention comprises a method for controlling a home appliance in dependence of a load to be handled by the home appliance comprising the following steps. A load image of the load is received on a server. This load image is processed to generate a processing result. In an embodiment, control data to control the home appliance is determined on the server based on the processing result. The control data is then sent to the home appliance. In another embodiment, the processing result is sent to the home appliance to enable the home appliance to determine the control data by itself. Of course, it is also conceivable to send both, the processing result and the control data from the server to the home appliance. The notion of a server in the context of this disclosure can be understood in a broad sense. Of course, it may be implemented as a cloud service or with any other form of distributed computing infrastructure, which is separate from the home appliance. Thus, also a cloud service can be understood as a server in the context of this disclosure.

The proposed method has the advantage that there is no need for a high-performance central processing unit (CPU) on the home appliance. The home appliance can simply capture an image of the load to be handled by the home appliance and send it to the server, where computationally complex operations can be carried out. This may reduce the cost of the home appliance, while improving the accuracy of the adaptation of the home appliance to the load.

In some embodiments, the step of processing the load image to generate the processing result comprises a step of analyzing the load using a trained neural network. This trained neural network can be, for example, a deep convolutional neural network, preferably a deep convolutional semantic segmentation neural network. One example of such a network is SegNet as described in the article "SegNet: A Deep Convolutional Encoder-Decoder Architecture for Image Segmentation" by Vijay Badrinarayanan, Alex Kendall, and Roberto Cipolla in the IEEE Transactions on Pattern Analysis and Machine Intelligence in 2017. The analysis may allow to segment the load image into various areas, where a specific type of load is present, with a high precision.

In some embodiments, the step of processing the load image to generate the processing result further comprises a step of upscaling the load image using a trained generative adversarial network (GAN), especially a super resolution generative adversarial network (SRGAN), before analyzing the load. The upscaled load image may be fed into the above mentioned neural network, where object detection and segmentation may be carried out. One example of a SRGAN can be found in the article "Photo-Realistic Single Image Super-Resolution Using a Generative Adversarial Network" by Christian Ledig et al., which was published in the IEEE Conference on Computer Vision and Pattern Recognition (CVPR) in July 2017. As will be explained in more detail below, it may be especially advantageous if the upscaling increases a resolution of the load image by a factor between two and eight, preferably between four and eight, most preferred between four and six. The usage of the GAN may allow to use a camera at the home appliance with a resolution, which (without the GAN) would be insufficient to allow for a meaningful segmentation of the load image by the neural network. Accordingly, a cheaper camera may be used at the home appliance. Moreover, an image processing electronics and a connectivity module within the home appliance may have a lower performance, which saves further costs.

The processing result may indicate an amount of the load or, even better, types of the load in dependence on a location of the load within the home appliance. It may comprise a segmentation of the load according to types of the load. The processing result may be, for example, a labeled segmented image of the load, wherein the labels preferably refer to types of the load. The home appliance may be a dishwasher and the types of the load may comprise, for example, glass, plastic, metal, ceramic and empty space.

If the load is known, the dishwasher can precisely adapt its cleaning and drying behavior according to the load. For example, if the amount of plastic within the load is quite high, a drying period may be prolonged. If a lot of glass is present in the load, the application of rinse aid may be decreased and the temperature and the water pressure may be lowered to avoid glass corrosion. Empty spaces can be located and a velocity of the spray arm may be adapted accordingly, when the spray arm passes the empty spaces. As an exact angle of the spray arm within the dishwasher is known to the home appliance, a labeled segmented image of the load may allow the dishwasher to dynamically adapt the water pressure of the water spray according to the type of load at which at present the water spray is targeted. This avoids that, for example, plastic bowls are flipped or propelled from the rack.

Accordingly, in some embodiments, the control data may comprise a control command relating to at least one of a drying time, a rinse time, and a spray pressure of a spray arm. This may be especially advantageous if an amount of plastic within the load surpasses a plastic threshold. The control data may also comprise a control command relating to at least one of a temperature, a spray pressure of a spray arm and a quantity of rinse-aid, which may be advantageous if an amount of glass within the load surpasses a glass threshold. Furthermore, the control data may comprise a control command to instruct a spray arm to skip an empty space. This is especially valuable if an amount of empty space within the load surpasses a gap threshold.

From the perspective of the home appliance, the method for controlling the home appliance in dependence of the load to be handled by the home appliance may comprise the following steps. First, a load image of the load to be handled by the home appliance is taken with a camera, which may be arranged at the home appliance. Afterwards, the load image is sent to the server. In some embodiments, the home appliance receives control data derived from the load image as a response from the server. In other embodiments, the home appliance receives a processing result derived from the load image from the server and determines control data by itself based on the processing result. Of course, it is also conceivable that the home appliance receives both, the processing result and the control data from the server. Based on the control data the home appliance controls at least one working program of the home appliance.

According to a further aspect of the invention, a server for controlling a home appliance in dependence of a load to be handled by the home appliance is provided. The server comprises a receiving module configured to receive a load image of the load from the home appliance, a processing module configured to process the load image to generate a processing result and a sending module. In some embodiments, the server comprises a determination module configured to determine control data to control the home appliance based on the processing result and the sending module is configured to send the control data to the home appliance. In other embodiments the sending module is configured to send the processing result to the home appliance to enable the home appliance to determine control data to control the home appliance based on the processing result. The sending module may be also configured to send both, the processing result and the control data. If the server determines the control data, it is advantageous if the server has access to information about the type and/or configuration of the home appliance. If the home appliance determines the control data by itself, it may not be necessary that the server has access to this information.

The processing module may comprise a trained neural network. As already described, this may be a deep convolutional neural network, preferably a deep convolutional semantic segmentation neural network. Furthermore, the processing module may comprise a trained generative adversarial network, especially a super resolution generative adversarial network. This may allow to upscale the load image by a factor between two and eight, preferably between four and eight, most preferred between four and six. The calculations of a neural network are complex and need a large amount of computing power. Thus, the allocation of the processing module to the server has the advantage that an analysis of a load may be accomplished faster. Moreover, a cheaper CPU can be used in the home appliance.

According to yet a further aspect, the invention proposes a home appliance, which comprises a camera for taking a load image of a load to be handled by the home appliance, a sending module for sending the load image to a server and a receiving module. The receiving module may be adapted for receiving control data derived from the load image from the server. Alternatively or in addition, it may be adapted for receiving a processing result derived from the load image from the server. Therefore, the home appliance may comprise a determination module for determining control data based on the processing result. The home appliance is furthermore equipped with a control module for controlling at least one working program of the home appliance based on the control data. As already mentioned, the home appliance may be especially a dishwasher.

The camera may be arranged at a front of the home appliance. In some embodiments, the home appliance comprises at least one rack for holding the load. In this case, the home appliance may be configured to capture the load image of the load using the camera when the at least one rack is in a pulled out position. Accordingly, the home appliance may comprise a sensor for detecting a pulled out position of the at least one rack. In some embodiments, the home appliance comprises a lower rack and an upper rack. Preferably, the positions of each of the racks can be determined by a corresponding sensor. It is advantageous if a load image of the upper rack is taken, when the upper rack is in a pulled out position and the lower rack is in a pushed in position. Likewise it is preferred to take a load image of the lower rack, when the lower rack is in a pulled out position and the upper rack is in a pushed in position. This improves an accuracy when the load is analyzed based on the respective load image. As already mentioned, due to the GAN, especially the SRGAN, a cheap camera with a low resolution may be used without impairing the capability of the server to analyze the load. This allows to use a camera, which provides a load image with a resolution of less than 20.000 pixels, preferably with a resolution of less than 10.000 pixels.

Furthermore, the invention comprises a system comprising the disclosed home appliance and the described server according to a further aspect. According to yet a further aspect, the invention provides a computer program product comprising instructions which, when the program is executed by a computer, cause the computer to carry out the method described above. The computer program may be stored on a data carrier or may be downloadable from a central data repository.

The invention has been described with regard to a method, a server, a home appliance, a system and a computer program product. If not stated otherwise, features disclosed with regard to one claim category may be applied to all other claim categories and vice versa.

In the following, further details and relating advantages of embodiments of the invention will be explained with reference to the figures.

BRIEF DESCRIPTION OF THE FIGURES

FIG. 3 two exemplary load images taken by the camera according to FIG. 2;

FIG. 4 an example of a load image and a resulting labeled segmented image of the load;

DETAILED DESCRIPTION OF THE INVENTION

In the following, similar features and features having similar functions will be referred to with the same reference sign, if not stated otherwise.

Figure 1:
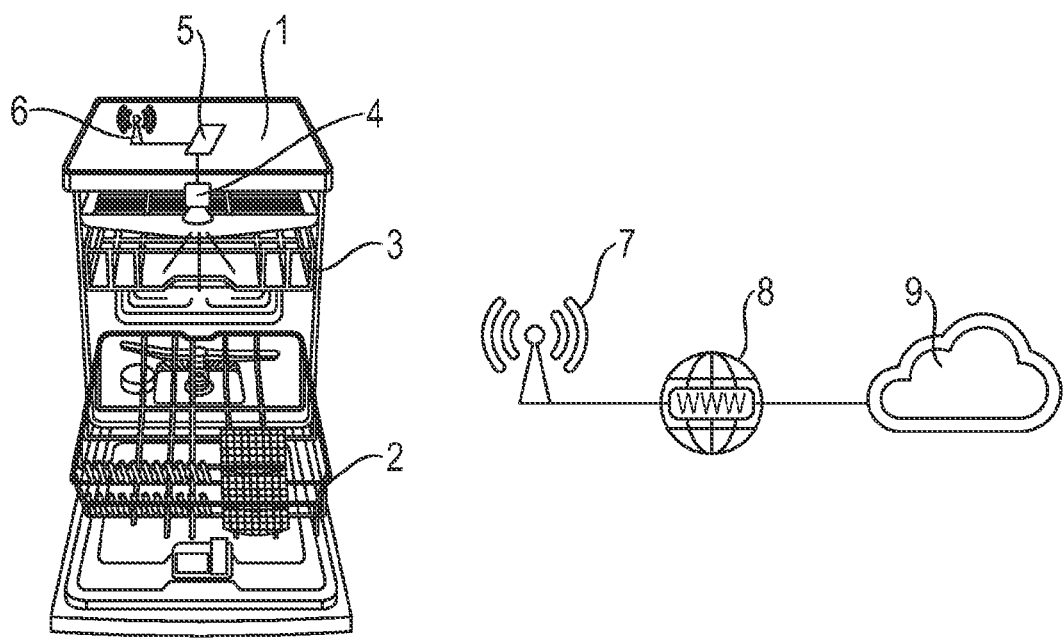
FIG. 1 an embodiment of a system according to the invention.

FIG. 1 illustrates an embodiment of a system according to the invention. On the left side an embodiment of a home appliance 1, in the form of a dishwasher, is shown with a lower rack 2 and an upper rack 3. A camera 4 is able to take load images of each of the racks. It is connected to a CPU 5, which is coupled to a communication module 6. The load images are sent to a Wifi hotspot 7 in the home, which forwards them via the Internet 8 to a server 9, which is implemented as a cloud service. The server 9 analyzes the load images and sends the results back to the home appliance 1, which controls its behavior based on the results.

Figure 2A:
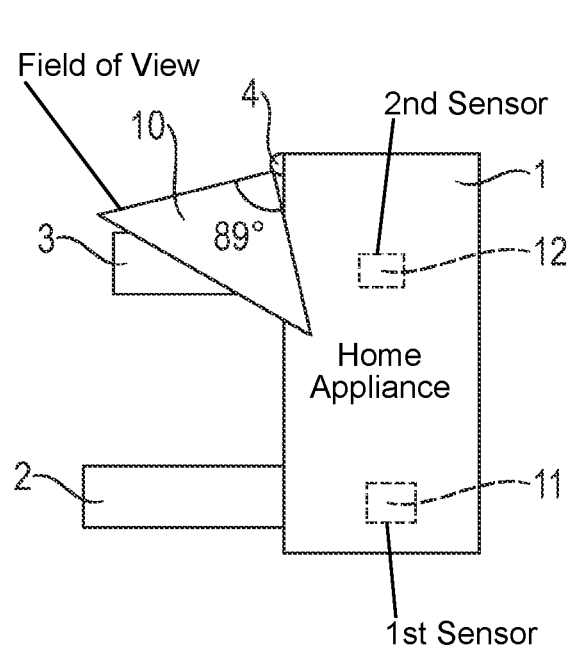
FIG. 2 a possible arrangement of a camera at an embodiment of a home appliance according to the invention.
Figure 2B:
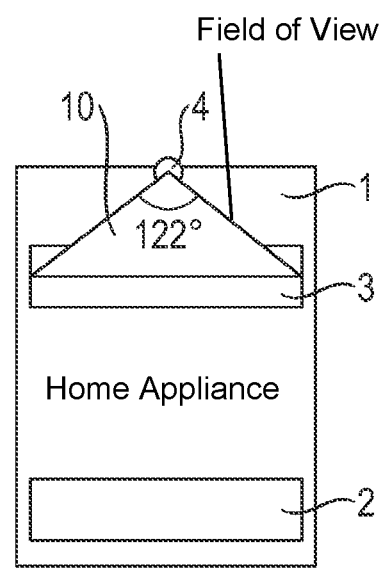

FIG. 2 illustrates a possible arrangement of the camera 4 at the home appliance 1. While FIG. 2a shows a side view, a front view is depicted in FIG. 2b. The camera 4 is arranged at the front of the home appliance 1 and may have a field of view 10, for example, between 80° and 130°. In the shown embodiment, the angle of the field of view in the vertical dimension is 89° and in a horizontal dimension is 122°. While a first sensor 11 is able to detect a position of the lower rack, a second sensor 12 monitors the position of the upper rack 3. In this way, the camera 4 can be triggered in the right situation to take a picture of the load.

FIG. 3a shows an example of a load image of the upper rack 3 taken by the camera 4. An example of a load image of the lower rack 2 is illustrated in FIG. 3b.

FIG. 4 illustrates an example of the semantic segmentation. In FIG. 4a an exemplary load image 13 is shown and in FIG. 4b an exemplary labeled segmented image 14 of the load, which corresponds to the load image 13. Possible types of load are empty 15, plastic 16, metal 17, glass 18 and ceramic 19. As can be seen in FIG. 4b, the load image 13 comprises 3 regions, a first region 20 loaded with metal, a second region 21 loaded with ceramic and a third region 22, which is empty.

Figure 5:
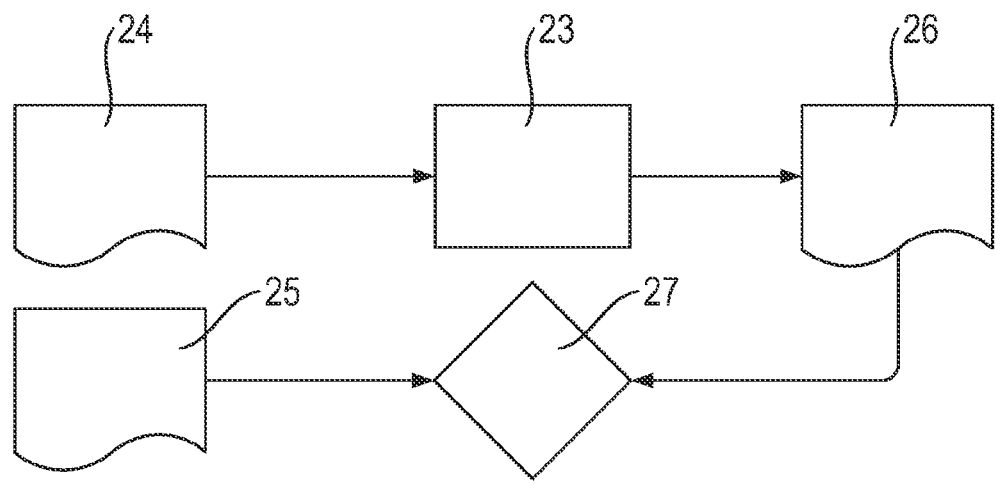
FIG. 5 an example how the neural network may be trained.

FIG. 5 shows an example of how a deep convolutional semantic segmentation neural network 23 can be trained with high-resolution images 24, which have been correctly segmented by humans (correct segmentation 25). The high-resolution images 24 are fed into the neural network 23, which delivers a result in the form of an estimated segmentation 26. The estimated segmentation 26 is compared to the correct segmentation 25 and deviations are evaluated according to a cost function. This means that a loss 27 is calculated. As is well known in the prior art, the loss is used to adapt the weights and biases of the neural network 23 using backpropagation.

Figure 6:
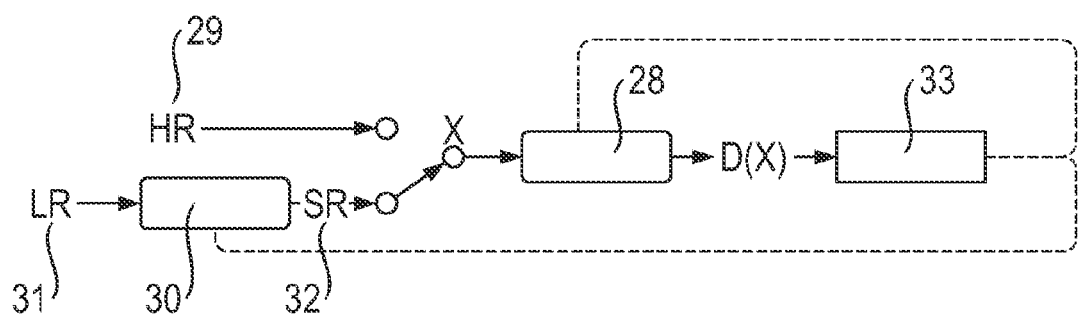
FIG. 6 a schematic illustration of an embodiment of a GAN.

FIG. 6 shows a basic principle of how a GAN may work, which is well known in the prior art. A discriminator 28 (which is a neural network) is trained with high-resolution images 29 first. When the discriminator is sufficiently trained, a GAN 30 takes low-resolution images 31 as an input and tries to generate super-resolution images 32 (i.e. upscaled images) which are indistinguishable for the discriminator 28 from high-resolution images 29. A loss 33 is calculated, which is used to adapt the weights and biases of the GAN 30.

Figure 7:
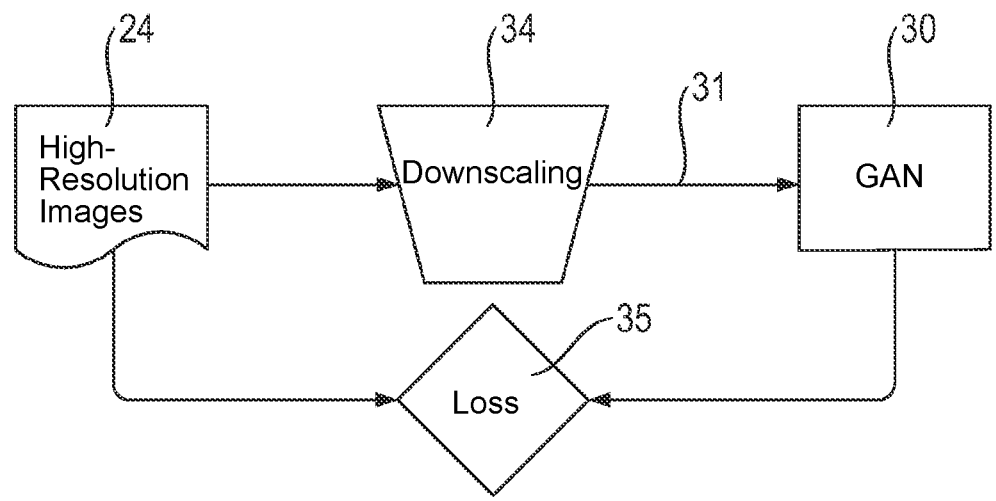
FIG. 7 an example how a GAN may be trained.

In the embodiment shown in FIG. 7, the low-resolution images 31 are generated for training purposes from the high-resolution images 24 by downscaling 34. The low-resolution images 31 are afterwards upscaled by the GAN 30 and a loss 35 between the original high-resolution images 24 and the images upscaled by the GAN 30 is calculated to train the GAN 30. In this way, the GAN 30 learns to generate realistic high-resolution images of the load from low-resolution load images.

Figure 8:
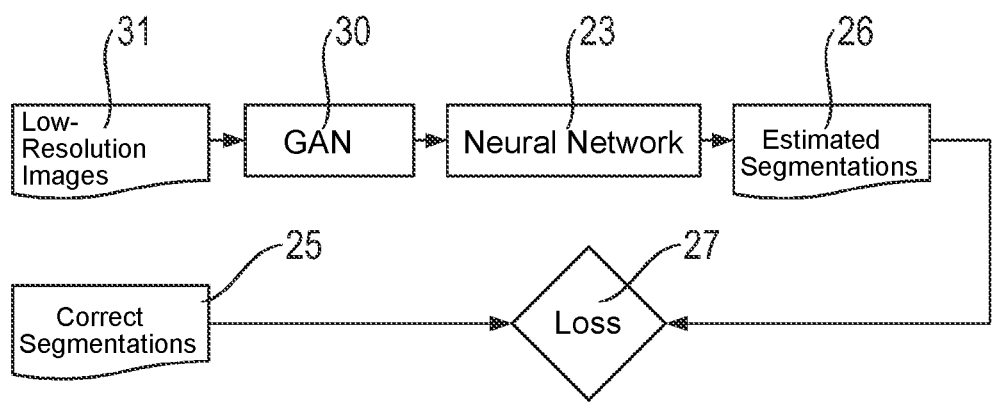
FIG. 8 an exemplary combination of a GAN with a neural network.

FIG. 8 illustrates how an embodiment of the processing module according to the invention may be trained. Once the GAN 30 has been sufficiently trained, the weights and biases of the GAN 30 are fixed, i.e. the training of the GAN is completed. Low-resolution images 31 are fed into the GAN 30, which upscales the images and feeds them into the deep convolutional semantic segmentation neural network 23, which outputs estimated segmentations 26. The estimated segmentations 26 are compared with the correct segmentations 25 to calculate the loss 27, which is used to fine-tune the weights and biases of the neural network 23.

Figure 9:
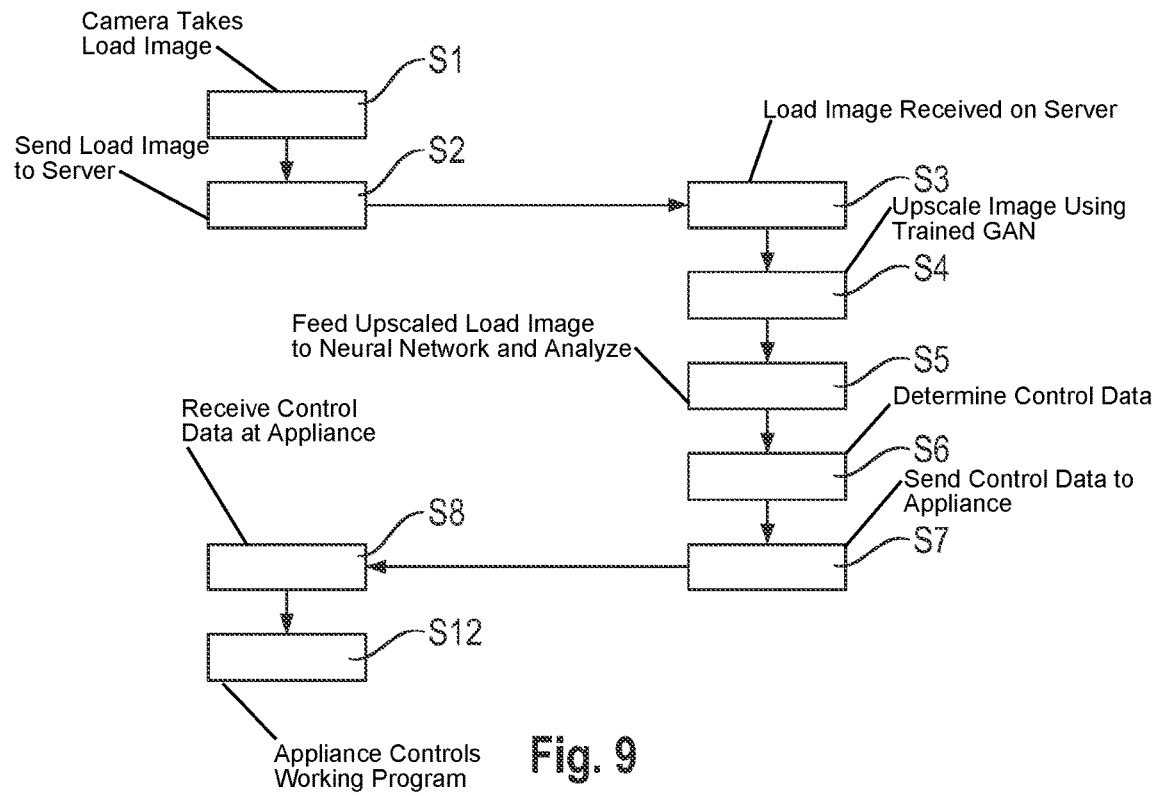
FIG. 9 a first embodiment of a method according to the invention.

FIG. 9 illustrates a first embodiment of the method according to the invention. The steps carried out on the home appliance 1 are shown on the left side and the steps carried out on the server 9 are located on the right side. In a first step S1, a load image 13 of the load is taken with a camera 4. The load image 13 is then sent to the server 9 in step S2. In step S3, the load image 13 is received on the server 9, where it is upscaled using a trained GAN 30 in step S4. The upscaled load image is fed into a neural network 23, which analyzes the load image in step S5. Based on the processing result of the neural network, e.g. a labeled segmented image of the load 14, control data to control the home appliance is determined in step S6. The control data is sent to the home appliance in step S7, where it is received in step S8. In step S12, the home appliance controls at least one working program of the home appliance based on the control data.

Figure 10:
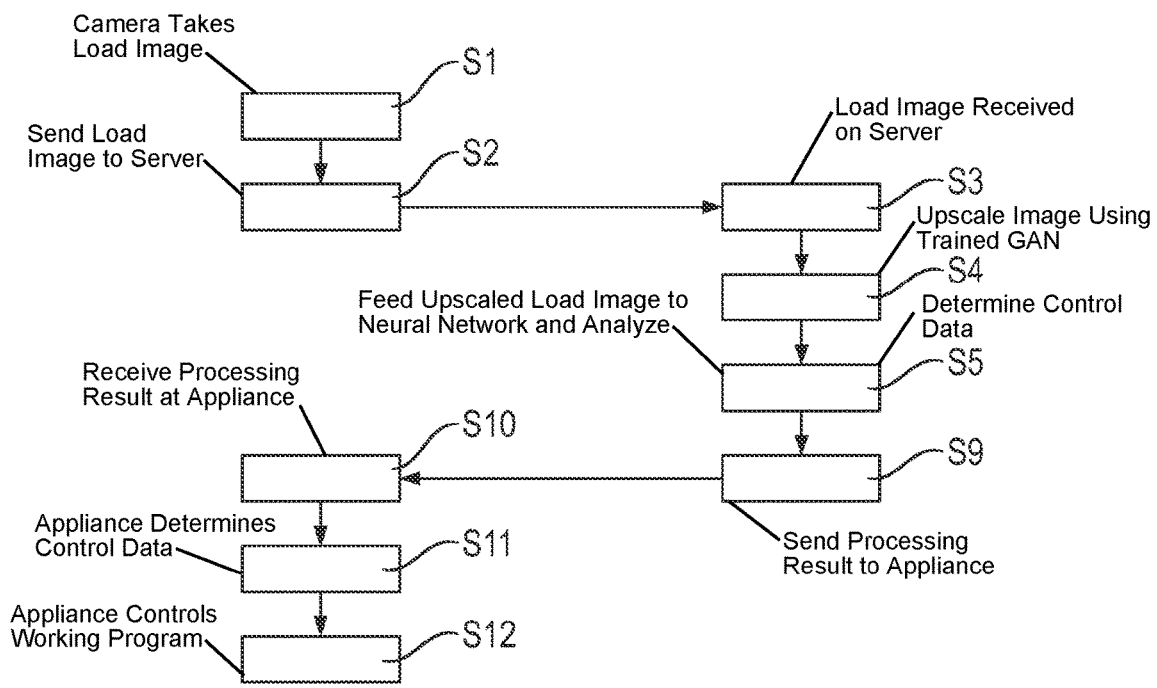
FIG. 10 a second embodiment of a method according to the invention.

FIG. 10 shows a second embodiment of the method according to the invention. Again, the steps carried out on the home appliance 1 are located on the left side and the steps carried out on the server 9 are depicted on the right side. The steps S1 to S5 are the same as in the first embodiment. However, the step S6 is missing in the second embodiment. Instead, in step S9, the processing result is send to the home appliance, where it is received in step S10. In step S11, the home appliance determines control data based on the processing result by itself, which is used afterwards in step S12 to control at least one working program of the home appliance. In comparison to the second embodiment, the first embodiment has the disadvantage that the server may need knowledge about the type and configuration of the home appliance to be able to determine reasonable control data. However, it has the advantage that the determination of the control data may be carried out by a CPU on the server with a higher performance in comparison to the CPU of the home appliance.

Figure 11:
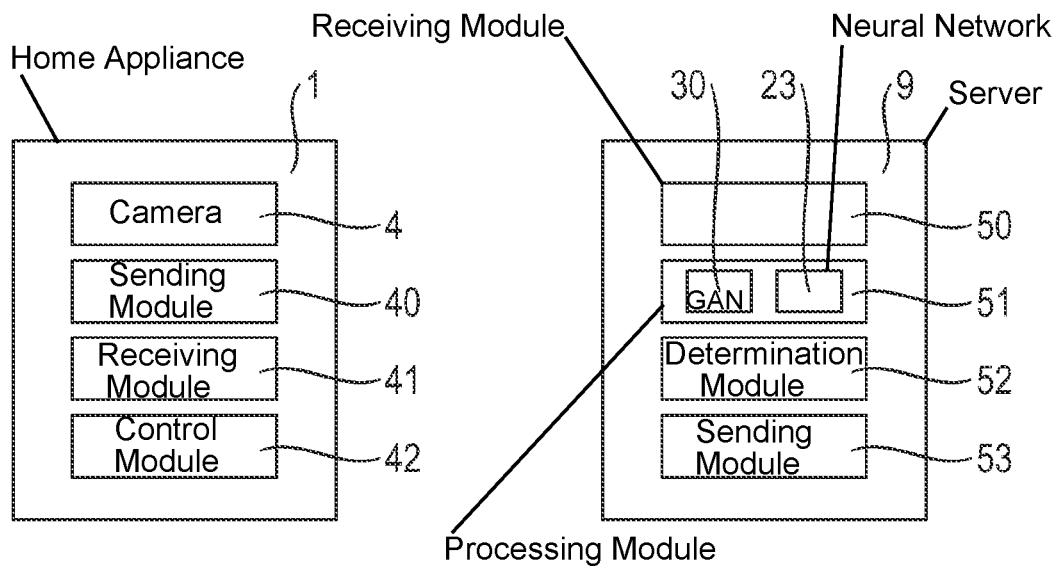
FIG. 11 a first embodiment of a home appliance and a server according to the invention.

FIG. 11 illustrates a first embodiment of a home appliance 1 according to the invention and a first embodiment of a server 9 according to the invention. The first embodiment of the home appliance 1 comprises a camera 4 for taking a load image of the load to be handled by the home appliance 1. Furthermore, it has a sending module 40 for sending the load image to a server and a receiving module 41, which is adapted to receive control data derived from the load image from the server in the first embodiment. In addition, the home appliance 1 comprises a control module 42 for controlling at least one working program of the home appliance based on the control data. The first embodiment of the server 9 comprises a receiving module 50, which is configured to receive a load image of the load from the home appliance 1, and a processing module 51 configured to process the load image to generate a processing result. The processing module 51 is equipped with a GAN 30 and a neural network 23. In addition, the server 9 comprises a determination module 52 configured to determine control data to control the home appliance based on the processing result and a sending module 53 configure to send the control data to the home appliance 1.

Figure 12:
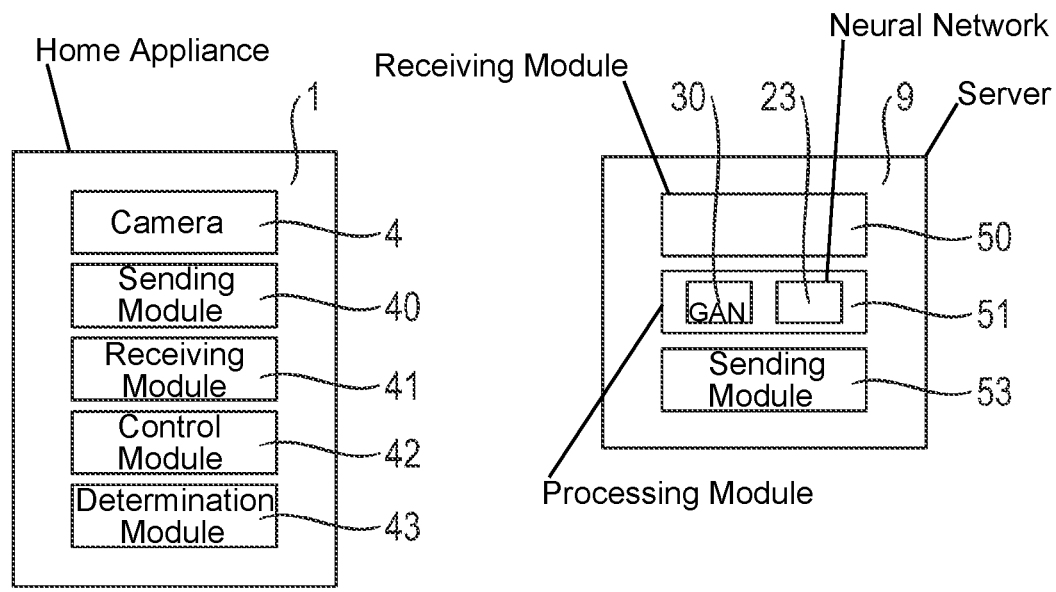
FIG. 12 a second embodiment of a home appliance and a server according to the invention.

FIG. 12 shows a second embodiment of a home appliance 1 according to the invention and a second embodiment of a server 9 according to the invention. The main difference between the first and the second embodiment of the home appliance is that the second embodiment of the home appliance 1 comprises in addition a determination module 43 for determining control data based on the processing result. In comparison to the first embodiment of the server 9, the second embodiment of the server 9 does not comprise a determination module 52, instead the sending module 53 of the second embodiment of the server 9 is configured to send the processing result to the home appliance 1 to enable the home appliance to determine control data to control the home appliance based on the processing result on its own.

The following table illustrates an important advantage which may be achieved by the present invention:

| Down sample scale | 1x (640 × 480) | 2x (320 × 240) | 4x (160 × 120) | 5x (128 × 96) | 6x (106 × 80) | 7x (91 × 68) | 8x (80 × 60) | 16x (40 × 30) |
|---|---|---|---|---|---|---|---|---|
| Pixels | 307200 | 76800 | 19200 | 12288 | 8480 | 6188 | 4800 | 1200 |
| Recognition accuracy with GAN | ~83% | ~82% | ~79% | ~77% | ~75% | ~70% | ~65% | ~49% |
| Recognition accuracy without GAN | ~83% | ~78% | ~52% | ~50% | ~48% | ~43% | ~40% | ~40% |

In the first row the resolution of the image, which is processed by the processing module, is given. The highest resolution is 640×480 pixels, which leads to an overall number of pixels of 307.200 (see the second row). If this resolution is downscaled by a factor of 2, both dimensions are divided by two and a resolution of 320×240 results (see third column), which leads to an overall number of pixels of 76.800 (which is one fourth of 307.200). In the third row, the recognition accuracy of the semantic image segmentation performed by the processing module is shown, which results if the image having the resolution mentioned in the first row is fed into a GAN, where the image is upsampled to 640×480, before it is fed into the neural network. The recognition accuracy of the semantic image segmentation which results if the image having the resolution mentioned in the first row is fed directly into the neural network, without using a GAN before, is shown in the fourth row.

As can be seen in the third row, when going from a downscaling factor of 1 to a downscaling factor of 6, the recognition accuracy of the semantic image segmentation degrades only slightly from 83% to 75% if a GAN is used to upsample the images. If no GAN is used, the degradation is much severer and decreases from 83% to 48%. For a dishwasher, which is a non-life threating application, a recognition accuracy between 75% and 80% can be accepted. This allows to use a camera with a lower resolution at the dishwasher, which is of course much cheaper. Thus, the usage of a GAN on the server side allows to save hardware costs on the home appliance side, without significantly impairing the recognition accuracy.

Figure 13:
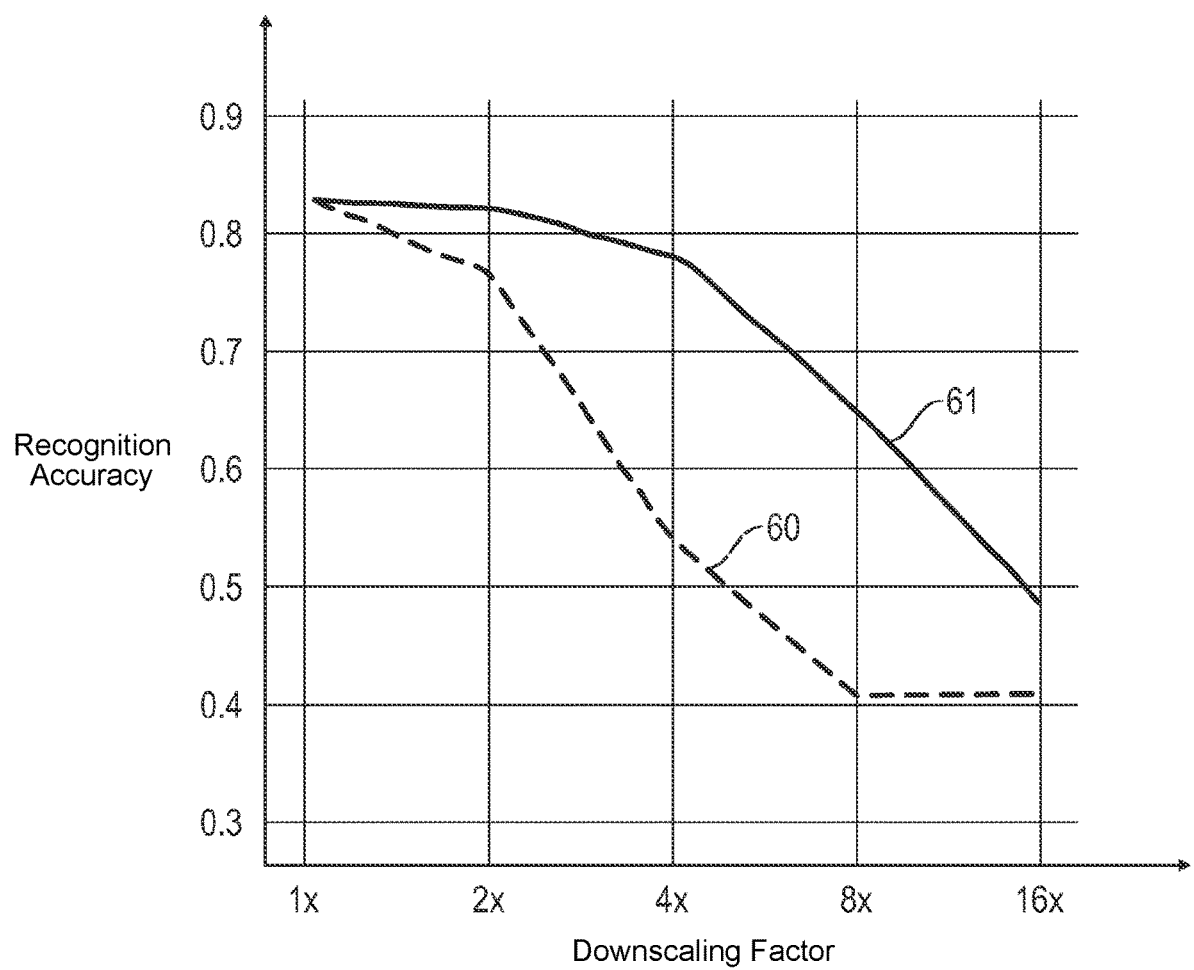
FIG. 13 an exemplary recognition accuracy of an embodiment of a server according to the invention.

FIG. 13 tries to visualize this correlation graphically. While the recognition accuracy is plotted on the vertical axis, the downscaling factor is outlined on the horizontal axis. The dashed line 60 relates to the recognition accuracy if no GAN is used and the solid line 61 shows the recognition accuracy if a GAN is used. A skilled person immediately understands that at a downscaling factor of 16 both approaches lead to insufficient results, but especially inbetween a downscaling factor of 4 and 8, the approach with GAN yields significantly better results than the approach without GAN.

The invention described above may among other things have the following advantages: The sending of the load image to the server allows to use the high computational power of the server, which especially allows to use neural networks for object recognition and image segmentation. In this way, the load to be handled by the home appliance may be recognized especially well, such that the home appliance can adapt its behavior very accurately in dependence on the load. Due to the usage of a GAN the overall cost of the camera hardware at the home appliance may be kept at a minimum. High-speed image acquisition may be possible because with a decrease of the resolution the camera may be able to take pictures at a higher speed. This may decrease the blurriness of pictures which are taken in motion, especially when the racks of the dishwasher are pushed in. The performance under low light conditions may be improved (when it is dusky in the kitchen). Moreover, the signal-to-noise-ratio may be improved. Less data processing may be needed at the dishwasher and the amount of data which needs to be sent to the server may be lower, which further reduces the costs.

The description with regard to the figures is to be interpreted in an illustrative, rather than in a restrictive sense. Many modifications may be made to the described embodiments without departing from the scope of the invention as set forth in the appended claims.

LIST OF REFERENCE SIGNS 1 home appliance
2 lower rack
3 upper rack
4 camera
5 CPU
6 communication module
7 Wifi hotspot
8 Internet
9 server
10 field of view
11 sensor
12 sensor
13 load image
14 labeled segmented image of the load
15 empty
16 plastic
17 metal
18 glass
19 ceramic
20 first region with metal
21 second region with ceramic
22 third region, which is empty
23 neural network
24 high-resolution images
25 correct segmentation
26 estimated segmentation
27 loss
28 discriminator
29 high-resolution images
30 GAN
31 low-resolution images
32 super-resolution images (upscaled images)
33 loss
34 downscaling
35 loss
40 sending module
41 receiving module
42 control module
43 determination module
50 receiving module
51 processing module
52 determination module
53 sending module
60 recognition accuracy without GAN
61 recognition accuracy with GAN
S1 taking a load image
S2 sending the load image
S3 receiving the load image
S4 upscaling the load image
S5 analyzing the load using a neural network
S6 determining control data
S7 sending control data
S8 receiving control data
S9 sending the processing result
S10 receiving the processing result
S11 determining control data
S12 controlling at least one working program of the home appliance

The invention claimed is:

1. A method for controlling a home appliance in dependence on a load to be handled by the home appliance, the method comprising:
    taking a load image of the load with a camera disposed at the home appliance, wherein the camera provides the load image with a resolution of less than 20,000 pixels;
    sending the load image from the home appliance to a server;
    receiving the load image on the server;
    processing the load image on the server by upscaling the load image to obtain an upscaled load image using a trained generative adversarial network, and then segmenting the load in the upscaled load image with a trained neural network to obtain a labelled segmented image indicating a segmentation of the load according to types of the load; and
    based on the labelled segmented image, dynamically adapting a water pressure of a water spray of a spray arm in the home appliance according to one of the types of the load at which the water spray is presently targeted;
    wherein weights and biases of the trained neural network have been fine-tuned using upscaled load images.

2. The method according to claim 1, which further comprises providing the trained neural network as a deep convolutional neural network.

3. The method according to claim 1, which further comprises providing the trained generative adversarial network as a super resolution generative adversarial network and using the upscaling to increase resolution of the load image by a factor of between two and eight.

4. The method according to claim 3, which further comprises increasing the resolution of the load image by a factor of between four and eight.

5. The method according to claim 3, which further comprises increasing the resolution of the load image by a factor of between four and six.

6. The method according to claim 1, which further comprises processing the upscaled load image to indicate an amount of the load.

7. The method according to claim 1, which further comprises:
    using labels to refer to the types of the load; and
    generating a control command, based on the labelled segmented image, to dynamically adapt the water pressure of the water spray of the spray arm in the home appliance according to one of the types of the load at which the water spray is presently targeted.

8. The method according to claim 1, which further comprises providing a dishwasher as the home appliance, and providing at least one of glass, plastic, metal, ceramic and empty space as the types of the load.

9. The method according to claim 8, which further comprises providing control data to control the home appliance based on the labelled segmented image, as a control command relating to instructing the spray arm to skip an empty space, when an amount of the empty space within the load surpasses a threshold.

10. A non-transitory computer readable medium having a set of computer executable instructions formed thereon which, when executed on a computer, cause the computer to carry out the method according to claim 1.

11. The method according to claim 1, which further comprises providing the trained neural network as a deep convolutional semantic segmentation neural network.

12. The method according to claim 1, wherein the resolution of the load image provided by the camera is less than 10,000 pixels.

13. The method according to claim 1, wherein the upscaled load images, which were used to fine tune the weights and the biases of the trained neural network, were obtained from the trained generative adversarial network.

* * * * *